(12) United States Patent
Anderson et al.

(10) Patent No.: US 9,140,402 B2
(45) Date of Patent: Sep. 22, 2015

(54) MOUNTING SYSTEM

(75) Inventors: Donald Anderson, Oak Park, IL (US);
Derrik Lam, Chicago, IL (US); Ralph Kuprewicz, Arlington Heights, IL (US);
Andy Whitley, Lake in the hills, IL (US)

(73) Assignee: Peerless Industries, Inc., Aurora, IL (US)

( * ) Notice: Subject to any disclaimer, the term of this patent is extended or adjusted under 35 U.S.C. 154(b) by 1183 days.

(21) Appl. No.: 12/562,523

(22) Filed: Sep. 18, 2009

(65) Prior Publication Data

US 2010/0237210 A1    Sep. 23, 2010

Related U.S. Application Data

(60) Provisional application No. 61/102,254, filed on Oct. 2, 2008.

(51) Int. Cl.
| | |
|---|---|
| *E04G 3/00* | (2006.01) |
| *F16M 11/04* | (2006.01) |
| *F16M 11/20* | (2006.01) |
| *F16M 13/02* | (2006.01) |

(52) U.S. Cl.
CPC ............. *F16M 11/04* (2013.01); *F16M 11/043* (2013.01); *F16M 11/2007* (2013.01); *F16M 13/02* (2013.01); *F16M 2200/068* (2013.01); *Y10T 29/49895* (2015.01)

(58) Field of Classification Search
CPC .. G03B 21/005; G03B 21/132; G03B 21/003; F16M 11/12; F16M 12/00
USPC ................. 248/274.1, 298.1, 346.01, 346.03, 248/346.06, 317, 343, 344, 155.2, 284.1, 248/323, 205.1, 551, 221.11, 343.3, 917; 29/464; D16/235; 353/28, 119, 122; 362/581, 515, 512, 528

See application file for complete search history.

(56) References Cited

U.S. PATENT DOCUMENTS

| | | | |
|---|---|---|---|
| 1,568,758 | A | 1/1926 | Malcolm |
| 1,703,649 | A | 2/1929 | Weinstein |
| 2,186,607 | A | 1/1940 | Judge et al. |
| 2,870,985 | A | 1/1959 | Martin et al. |

(Continued)

FOREIGN PATENT DOCUMENTS

| | | |
|---|---|---|
| DE | 200 17 972 U1 | 1/2001 |
| DE | 20017972 U1 | 1/2001 |

(Continued)

OTHER PUBLICATIONS

U.S. Appl. No. 23/329,127, filed Dec. 9, 2008, Anderson et al.

(Continued)

*Primary Examiner* — Kimberly Wood
(74) *Attorney, Agent, or Firm* — Foley & Lardner LLP

(57) ABSTRACT

An universal mounting system for mounting a projector or other device to a surface. The mounting system comprises a base configured to operatively connect to the mounting surface. The base includes a periphery continuously disposed about the base and proximate an intermediate portion of the base. At least one arm assembly is operatively connectable at any point along the entirety of the periphery. The at least one arm assembly includes at least one connection portion selectively locatable in relation to the periphery and adapted to operatively connect to a coupling location disposed on the projector.

5 Claims, 5 Drawing Sheets

(56) References Cited

U.S. PATENT DOCUMENTS

| | | | |
|---|---|---|---|
| 3,282,530 A * | 11/1966 | Rash | 242/127 |
| 3,440,331 A | 4/1969 | Cohen | |
| 3,574,340 A | 4/1971 | Busche | |
| D221,634 S | 8/1971 | Bradspies et al. | |
| 4,239,196 A | 12/1980 | Hanger | |
| D263,927 S | 4/1982 | Dewey | |
| 4,533,127 A | 8/1985 | Hawkins | |
| 4,566,663 A | 1/1986 | Barchus | |
| D286,147 S | 10/1986 | Carlson | |
| 4,673,154 A | 6/1987 | Karapita | |
| 4,764,008 A | 8/1988 | Wren | |
| 5,037,267 A | 8/1991 | Warner et al. | |
| 5,139,223 A | 8/1992 | Sedighzadeh | |
| 5,362,025 A | 11/1994 | Trom et al. | |
| 5,490,655 A | 2/1996 | Bates | |
| 5,690,459 A | 11/1997 | Donovan et al. | |
| 6,042,068 A | 3/2000 | Tcherny | |
| 6,131,863 A | 10/2000 | Fiacco | |
| 6,227,513 B1 | 5/2001 | Richard | |
| 6,237,884 B1 | 5/2001 | Howe | |
| 6,464,196 B1 | 10/2002 | Crookham et al. | |
| 6,491,293 B1 | 12/2002 | Brewer | |
| D480,100 S | 9/2003 | Lam | |
| 6,708,940 B2 | 3/2004 | Ligertwood | |
| D493,800 S | 8/2004 | Pfister et al. | |
| D494,596 S | 8/2004 | Pfister | |
| D494,978 S | 8/2004 | Pfister | |
| D495,713 S | 9/2004 | Pfister et al. | |
| D504,305 S | 4/2005 | Gillespie et al. | |
| D513,470 S | 1/2006 | Gillespie et al. | |
| 6,988,698 B2 | 1/2006 | O'Neill | |
| D514,612 S | 2/2006 | Boele | |
| 7,029,133 B2 | 4/2006 | Challis | |
| 7,152,836 B2 | 12/2006 | Pfister et al. | |
| D537,706 S | 3/2007 | Ly Hau et al. | |
| D540,367 S | 4/2007 | Dittmer | |
| 7,261,265 B2 | 8/2007 | Burns | |
| D551,943 S | 10/2007 | Hodjat et al. | |
| D554,476 S | 11/2007 | Peterson | |
| D554,491 S | 11/2007 | Stenberg | |
| D554,984 S | 11/2007 | Stenberg | |
| D558,562 S | 1/2008 | Ciungan et al. | |
| D558,563 S | 1/2008 | Ciungan | |
| D559,657 S | 1/2008 | Wohlford et al. | |
| D560,669 S | 1/2008 | Muday et al. | |
| D568,325 S | 5/2008 | Muday et al. | |
| D568,326 S | 5/2008 | Muday et al. | |
| D575,321 S | 8/2008 | van Kuijk | |
| D580,741 S | 11/2008 | Short | |
| D597,582 S | 8/2009 | Anderson | |
| 2002/0014573 A1 | 2/2002 | Anderson | |
| 2003/0151701 A1 | 8/2003 | Sedighzadeh | |
| 2003/0160142 A1 | 8/2003 | Brahler et al. | |
| 2004/0211872 A1 | 10/2004 | Dittmer et al. | |
| 2004/0232298 A1 | 11/2004 | Bremmon et al. | |
| 2004/0232301 A1 | 11/2004 | Bremmon et al. | |
| 2005/0035253 A1 | 2/2005 | Rixom | |
| 2005/0139742 A1 | 6/2005 | Frisell | |
| 2005/0161575 A1 | 7/2005 | Friederich et al. | |
| 2005/0236546 A1 | 10/2005 | O'Neill | |
| 2006/0065800 A1 | 3/2006 | Bremmon | |
| 2006/0186301 A1 | 8/2006 | Dozier et al. | |
| 2007/0145223 A1 | 6/2007 | Huang | |
| 2008/0061200 A1 | 3/2008 | Bouissiere | |
| 2008/0179475 A1 | 7/2008 | Whitley et al. | |

FOREIGN PATENT DOCUMENTS

| | | | |
|---|---|---|---|
| DE | 10044213 A1 | 4/2002 | |
| DE | 20217304 U1 | 4/2003 | |
| DE | 20306682 U1 | 8/2003 | |
| DE | 20315817 U1 | 12/2003 | |
| DE | 202004010224 U1 | 11/2004 | |
| DE | 102005002838 A1 | 8/2006 | |
| EP | 0332762 A1 | 9/1989 | |
| EP | 1431652 A2 * | 6/2004 | |
| EP | 1431652 A2 | 6/2004 | |
| EP | 1 443 260 A2 | 8/2004 | |
| EP | 1443260 A2 | 8/2004 | |
| FR | 7147757 | 8/1973 | |
| FR | 2319838 * | 7/1975 | F16M 11/04 |
| FR | 2319838 | 2/1977 | |
| FR | 2374868 | 7/1978 | |
| JP | 63-5321 | 2/1988 | |
| JP | 08-275093 | 10/1996 | |
| JP | 09-185125 | 7/1997 | |
| NL | 1022621 C1 | 8/2004 | |
| WO | WO03/067142 A1 | 8/2003 | |
| WO | WO2004/085909 A1 | 10/2004 | |

OTHER PUBLICATIONS

2005 Euromet Product Catalog, pages showing dia/Video Universal Mounting Brackets.
2008 Peerless Mounts Product Catalog (pp. 92-99).

* cited by examiner

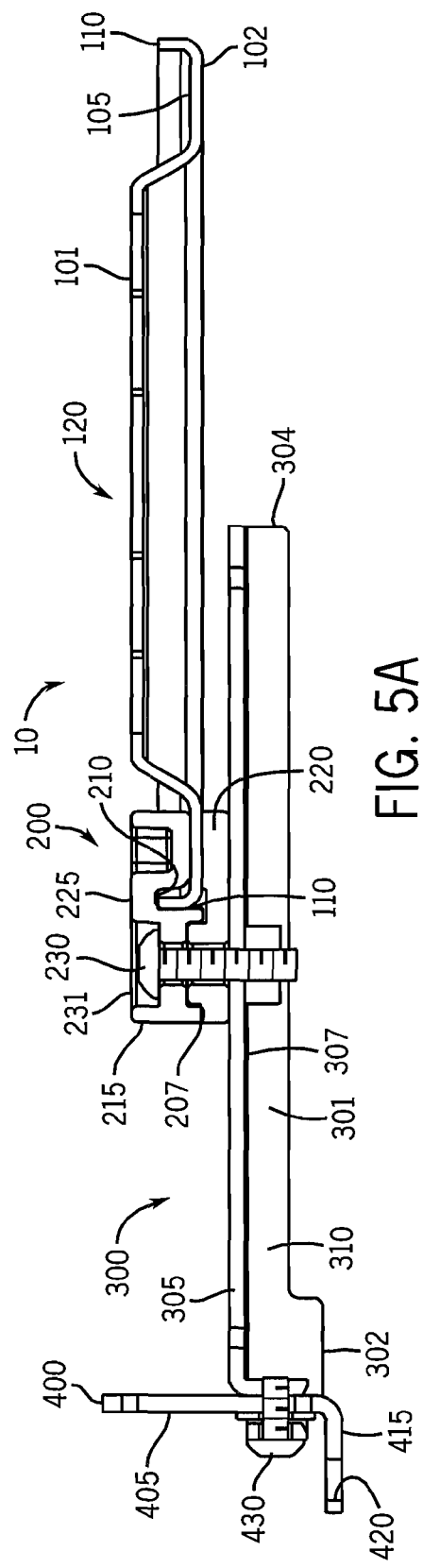
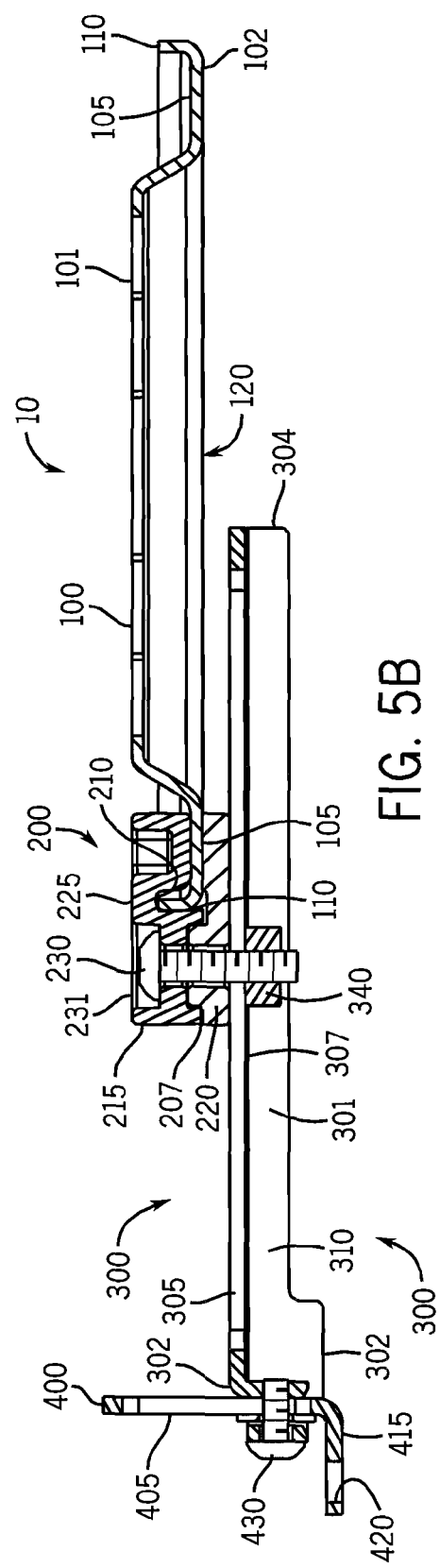

MOUNTING SYSTEM

CROSS-REFERENCE TO RELATED PATENT APPLICATIONS

This application claims priority from U.S. Provisional Application No. 61/102,254, filed Oct. 2, 2008 and the contents of which are incorporated herein by reference in their entirety.

FIELD OF THE INVENTION

The present invention relates generally to the field of systems for mounting projector devices. More particularly, the present invention relates to universal mounting systems for audio/visual devices such as video projector devices.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The use of projectors to display electronic media have become increasingly widespread in commercial, educational, and residential settings. A projector is commonly installed in conference rooms and classrooms to facilitate display of presentations and other media. Projectors have also become an alternative to the flat panel display for use in home theaters settings. It is often advantageous in these various settings to mount the projector to a surface such as a ceiling, wall, floor, or other surface using a mounting system. By mounting the projector to a surface, the projector remains substantially aligned with the display screen over time, the projector does not clutter to room or occupy space on a table, and unauthorized removal of the projector is mitigated.

In light of the demand for projectors, the number of projectors that are available to consumers from a multitude of manufactures and suppliers has expanded dramatically. These various projectors are available in a variety of sizes and form factors. Projectors often include a number of coupling features, such as threaded holes, on one or more surfaces to for connection with a mounting system. Although these features facilitate mounting of the projector to a surface, there is generally no standard with regard to the location and placement of these features on the projector. Consequently, the projectors of various manufactures may have, for example, different hole patterns or locations. Further, various projector models from a single manufacture may also be provided with differing patterns or locations.

The considerable array of existing and potential projector interfaces presents a challenge in regard to providing a cost effective, efficient, and robust mounting system. Accordingly, it may be necessary to use a mounting system specific to a particular projector to properly interface to the coupling features of the projector. Alternatively, an adjustable mounting system that is capable of adjusting to the variously located coupling features on a range of projectors may be used.

A number of adjustable mounting systems have been developed that provide a degree of flexibility with regard to interfacing with variously located coupling features. These systems generally feature a central plate or bracket from which appendages having various degrees of adjustability radiate outward. Some such systems include slots disposed in a portion of the central plate to allow for some adjustment in the placement of the appendages in relation to the central plate. For example, U.S. Design Pat. No. D514,612 shows a projector stand having a plurality of slots disposed in a central bracket and an arm extending from each of the slots. In a similar endeavor, U.S. Design Pat. No. D560,669 illustrates a bracket with a plurality of slots, an arm extending from each slot and an thumb-screw disposed at the end of each arm. U.S. Patent Application Publication 2005/0139742 describes a central square plate with arms pivotly coupled at the corners of the plate and adapted to receive a fastener for coupling to the projector. German Patent No. DE 100 44 213 A1 depicts a box, a plurality of arms attached to the corners of the box and fasteners disposed at the arm ends adapted to couple to a projector. German Patent No. G 202 17 304 U1 similarly depicts a central structure having a plurality of articulated arms attached its corners, with brackets extending downwardly from at least some of the articulated arms. European Patent Application No. EP 1 431 652 A2 shows a central bracket having a plurality of slots and brackets coupled to the plate at each of the slots, with each bracket adapted to receive a fastener for coupling to the projector.

Although the above systems offer some flexibility in reaching variously located coupling features disposed on the surface of the projector, their flexibility is generally limited by the configuration of the appendages to the central plate or bracket. In particular, because the individual appendages slidingly and/or pivotally connect to the central plate via slots or holes, there are certain portions adjacent the periphery of the central plate to which the appendages cannot be directly connected. Accessibility to regions of the projector surface is therefore limited by the geometry and placement of the slots and pivots to which the respective appendages are coupled to the central member or bracket. Thus, certain areas of the projector, which may include coupling features, may remain unreachable using these systems. Also, in order to cover the maximum area of the projector, these central plates will need to have more slots than attachment appendages. If the projector configuration requires that an attachment appendage utilize a slot or hole where no appendage is currently installed, the appendage will have to be completely removed from the central bracket and moved to that slot or hole. This operation adds to the installation time for each projector.

SUMMARY OF THE INVENTION

Various embodiments of the present invention provide a universal mount for mounting a projector or other device to a surface. Features of the mounting system are selectively adjustable to permit the mounting system to reach coupling features disposed at various positions on the projector.

In one set of embodiments, a projector mounting system comprises a base having a periphery continuously disposed about the base, and at least one arm assembly is selectively locatable and connectable along the entire periphery not otherwise occupied by another of the arm assemblies. The arm assembly is configured with at least one connection portion adapted to operatively couple to the projector. The arm assembly may further be selectively pivoted about an axis relative to the location where the arm assembly is connected to the periphery. Additionally, the arm assembly may also be selectively translated, extending and retracting the arm assembly in a radial direction relative to the location where the arm assembly is connected to the periphery. A coupling assembly may be implemented in operatively connecting the arm assembly to the base. The orientation of the arm assembly and the at least one connection portion may be selectively fixed in relation to the periphery via the coupling assembly. The at least one connection portion may also be selectively translated in a direction substantially parallel to the pivot axis to accommodate coupling features of various elevations on the projector.

Thus, various embodiments provide a projector mount that is efficiently adaptable to a range of projectors. Further, the flexibility of the projector mount permits operative connection to virtually any location on the mounting surface of the projector, not limited by the geometry or placement of slots or pivots on the base.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIGS. 5A and 5B are cross-sectional views of the projector mounting system of FIG. 4.

DETAILED DESCRIPTION OF VARIOUS EMBODIMENTS

Figure 1:
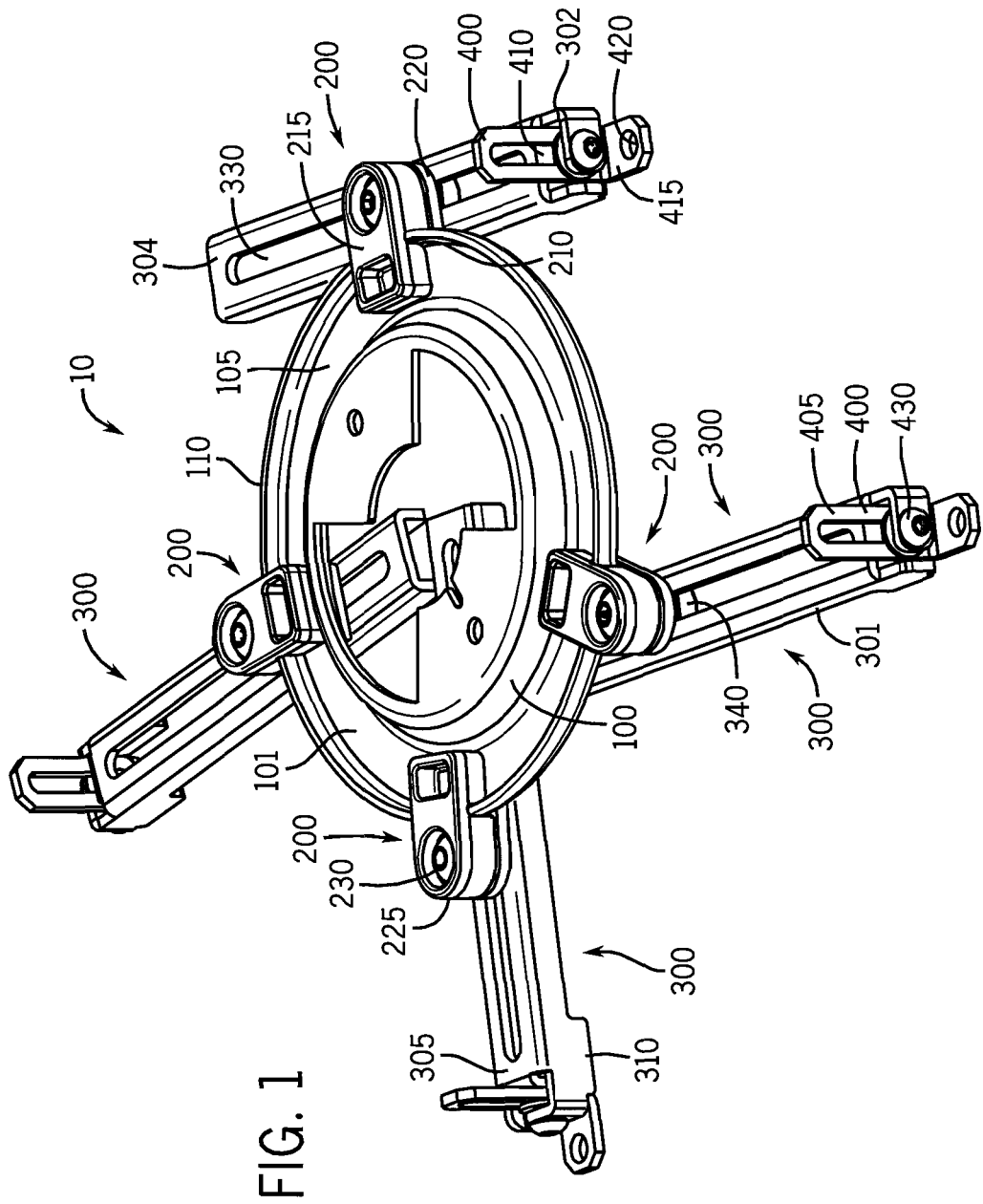
FIG. 1 is a perspective view of an embodiment of the projector mounting system of the present invention.
Figure 2:
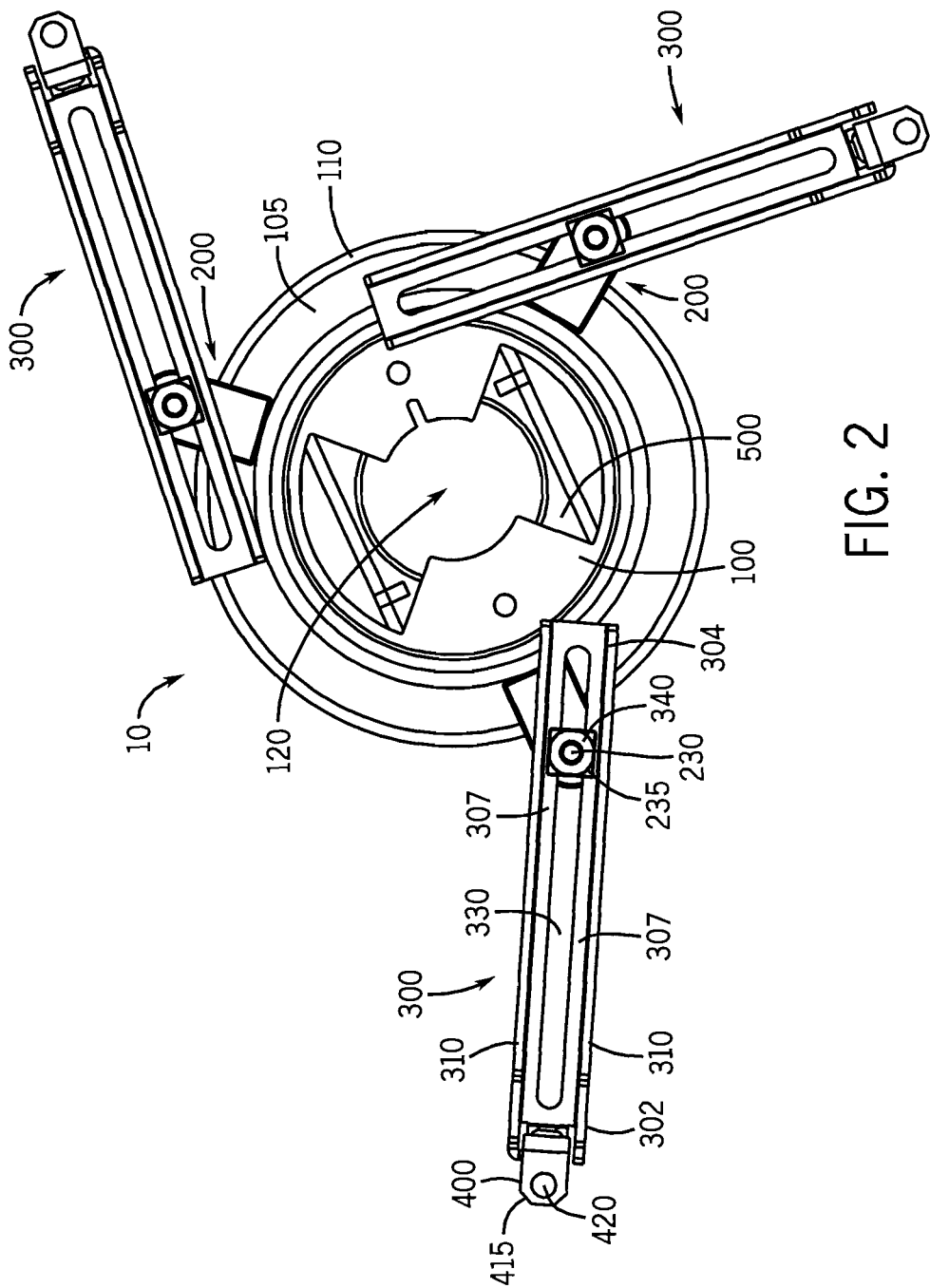
FIG. 2 is a bottom plan view of the projector mounting system of FIG. 1.
Figure 3:
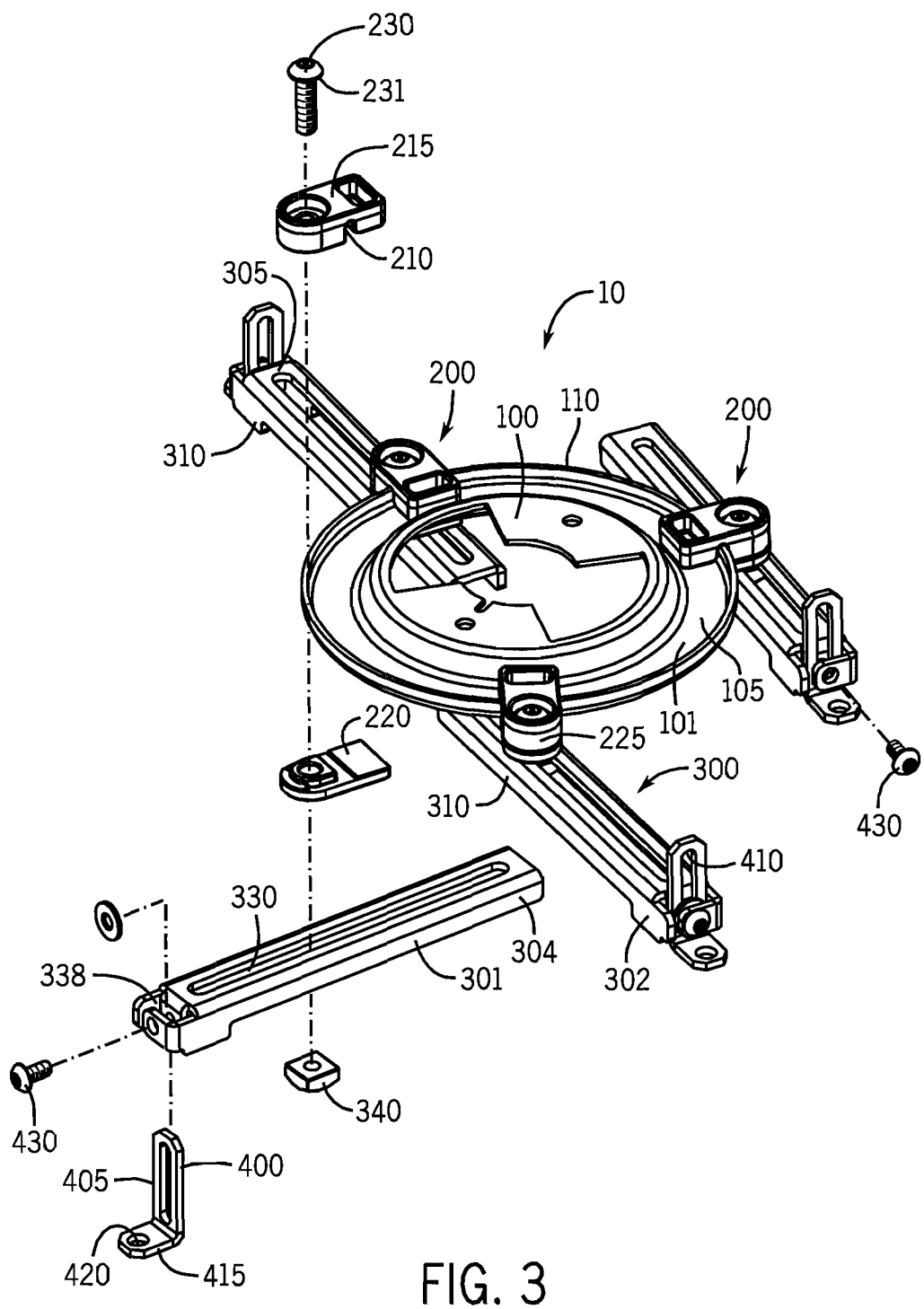
FIG. 3 is an exploded view of the projector mounting system of FIG. 1.
Figure 4:
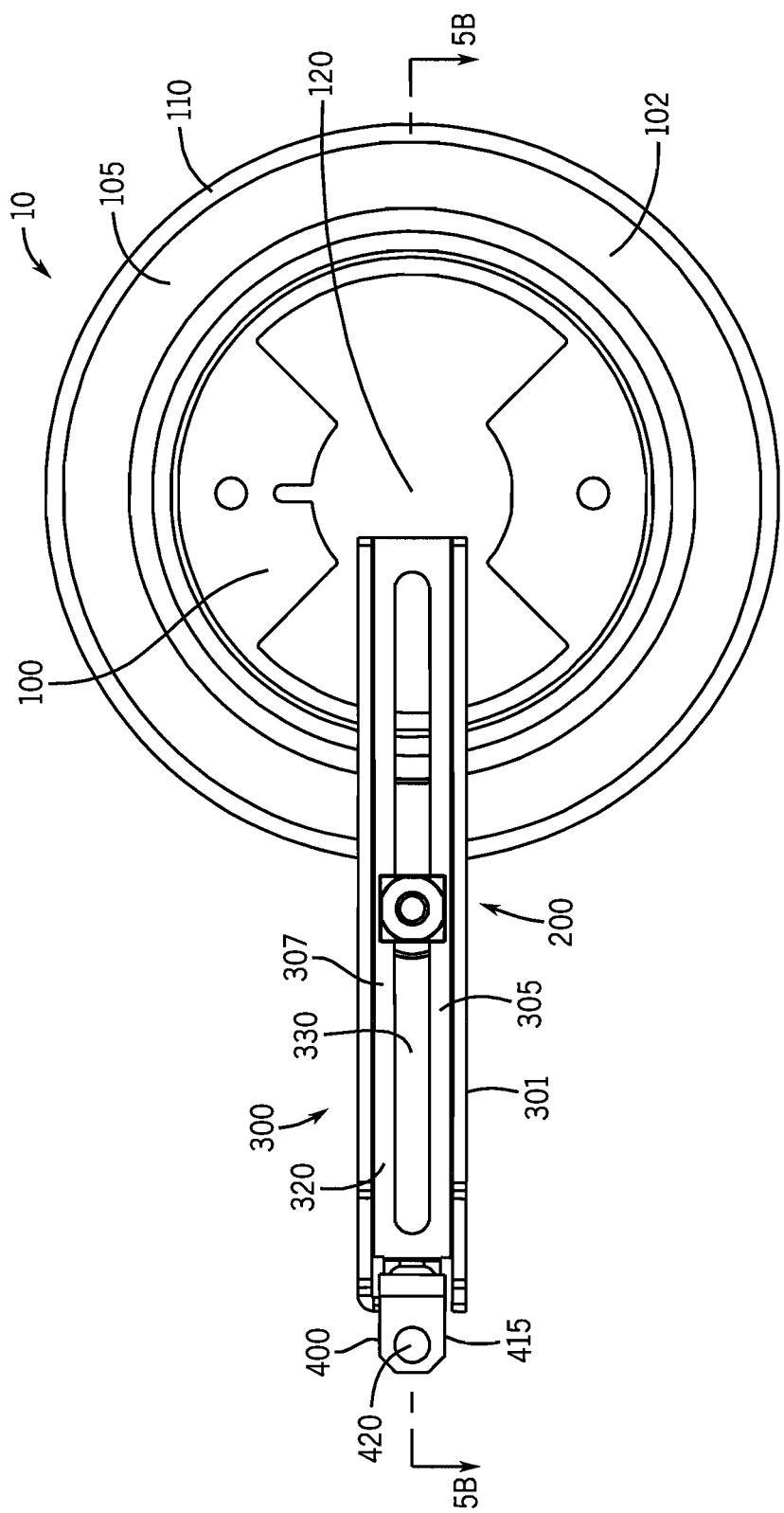
FIG. 4 is a bottom plan view of a projector mounting system comprising a base and one arm assembly.

FIGS. 1-3 illustrate a mounting system 10 constructed in accordance with an embodiment of the present invention. The mounting system 10 comprises a base 100, including a periphery 110, and an arm assembly 300 operatively connected to the base 100 at the periphery 110. The arm assembly 300 may be selectively positionable in relation to the base 100 to correspond to a coupling location disposed at substantially any point on a projector (not shown). It should be noted that, although the mounting system 10 is discussed herein as being used in conjunction with a projector, the mounting system 10 may also be used with other types of devices, including a variety of audio/visual devices.

One or more elevating structures 400 may be operatively coupled to the arm assembly 300. Each elevating structures 400 may be adapted to operatively couple to the projector at a coupling location and may further be selectively orientatable in relation to the arm assembly 300 to accommodate various elevational difference among various coupling locations. The mounting system 10 may further comprise a mounting bracket 500 operatively connected to the base 100. The mounting bracket 500 is adapted to operatively connect to a surface bracket (not shown) configured for attachment to a mounting surface such as a ceiling, wall, floor, or fixture surface. In an embodiment, the mounting system 10 includes a plurality of arm assemblies 300 and, in a more particular embodiment, may comprise four arm assemblies 300, as depicted in FIG. 1.

The base 100 may generally comprise a plate with a first surface 101 and a second surface 102 opposing the first surface 101. The periphery 110 is deposed proximate the outer portion of the base 100 and is substantially continuous about the base 100. An intermediate portion 105 is located on the base 100 proximate the periphery 110. A center 120 is disposed substantially at the center of the base 100 as defined by the periphery 110. As illustrated in FIG. 1, the base 100 is substantially circular. However, both the base 100 and the mounting system 10 as a whole may take a variety of shapes. The base 100 is operatively connected to the mounting surface and the projector. Accordingly, the base 100 comprises aluminum, steel, or other substantially rigid material in various embodiments.

The periphery 110 may comprise a raised surface extending outwardly from the base 100. In the depicted embodiment, the periphery 110 rises upwardly and substantially normal from the first surface 101, generally forming a "L" cross-section near the intermediate portion 105 of the base 100. However, in other embodiments, the periphery 110 may comprise other structures, including a feature extending downwardly from the second surface 102 as well as features extending from both the first surface 101 and the second surface 102, generally forming a "T" cross-section near the intermediate portion 105. Further embodiments of the periphery 110 may comprise a second feature disposed inwardly on the base 100 from the intermediate portion 105 and extending from the first surface 101, generally forming a "U" cross-section near the intermediate portion 105. Still further, the periphery 110 may comprise a second feature disposed inwardly on the base 100 from the intermediate portion 105 and extending from the first surface 101 and second surface 102, generally forming an "H" cross-section near the intermediate portion 105. In an embodiment, the periphery 110 comprises a separate member operatively coupled to the base 100. Although the periphery has generally been described as a raised or elevated surface or feature, it is not so limited. In still other embodiments, the periphery 110 may comprise a groove or depressed area. A groove or depression may further be provided in combination with a raised or elevated feature or surface.

Each arm assembly 300 comprises an arm 301. In the embodiment of FIG. 1, each arm assembly 300 comprises one arm 301 but other configurations may be constructed comprising a plurality of the arm 301 or a plurality of operatively coupled arm sections. For example, one or more the arms 301 may be configured to pivotally couple, articulate, or telescope in relation to each other. A plurality of arms 301 may be pivotly coupled to each other in order to extend the radial reach of the arm assembly 300 over a greater surface area of the projector. As depicted in FIGS. 1-3, each arm 301 comprises an elongated member having a first proximal end 304 and a second distal end 302 that is disposed substantially opposite the first proximal end 304. In the embodiment depicted in FIGS. 1-3, the arm 301 generally comprises a "U" cross-section having a top surface 305 and a pair of side surface 310 extending substantially normal from the top surface. Other embodiments of the arm 301 may be constructed where the cross-section is substantially tubular, rectangular, etc. The arm may also be substantially solid in certain embodiments. A region 320 resides in the volume partially formed by the top surface 305 and the pair of side surfaces 310. The arm 301 may further include one or more openings disposed in the top surface 305. The one or more openings may comprise holes of various sizes and shapes located along the length of the arm 301. In the depicted embodiment, the one or more openings comprise one or more slots 330 extending substantially over the length of the top surface 305. The slots 330 may have a uniform width, or it may vary over its length.

Each arm assembly 300 is operatively connected to the base 100 at the periphery 110. The operative connection is configured such that the arm assembly 300 may be selectively positioned at any point on the periphery 110 (so long as another arm assembly is not occupying that position). Various configurations may be constructed to operatively connect the arm assembly 300 to the periphery 110. In the embodiment depicted in FIG. 1, a coupling assembly 200 is operatively connected to the periphery 110 and the arm assembly 300. In the depicted embodiment, the coupling assembly 200 comprises an upper member 215 operatively connected to a lower member 220. At least a portion of the coupling assembly 200 is adapted to substantially correspond to the configuration of the periphery 110. For example, with reference to FIGS. 1, 5A and 5B, the upper member 215 and the lower member 220 are configured to receive a portion of the periphery 110 and engage at least a portion of the intermediate portion 105. The upper member 215 may be provided with a passage 210 extending from a lower surface 207 of the upper member 215. The passage 210 is configured to receive at least a portion of the periphery 110.

Each coupling assembly 200 may be selectively orientated at any point on the periphery 110. Various configurations of the coupling assembly 200 may be constructed where it may slidingly positionable, snapped into position, or other wise connectable to the periphery 110. As shown in the depicted embodiment, an outer portion 225 of the coupling assembly 200 may extend outwardly from the base 100. The upper member 215 and the lower member 220 may be operatively connected with a fastener 230 proximate the outer portion 225. The fastener 230 may, for example, comprise a pin, rod, bolt, or other coupling member and may further comprise a corresponding engaging feature 340, including a nut or a threaded portion of one of the features of the mounting system 10. By selectively engaging or disengaging the fastener 230, the coupling assembly may be selectively secured or released from the periphery 110. The upper member 215 and the lower member 220 may also be operatively connected using a mating or interlocking interface, a cam, or other configuration.

With reference to the embodiment shown in FIGS. 1, 3, 5A, and 5B, a fastener 230 is received by the upper member 215, the lower member 220, the slot 330 in the arm 301, and captured by the engaging feature 340. The engaging feature 340 is disposed in the region 320 formed in the arm 301. In the depicted configuration the coupling assembly 200 and the arm assembly 300 are operatively coupled such that the arm assembly 300 may be selectively positioned at any point on the periphery 110. Thus, the arm assembly 300 may be circumferentially orientatable in relation to the base 100.

The arm assembly 300 may also be pivotly orientatable in relation to the periphery 110 about an axis defined by the fastener 230. The arm assembly 300 is selectively orientated by rotating the arm 301 about the fastener 230. The arm assembly 300 may further be radially orientatable in a plane substantially normal to the axis of rotation in relation to the periphery 110. In the depicted embodiment, the fastener 230 is in sliding engagement within the slot 330, permitting selective radial adjustment of the arm assembly 300 in relation to the periphery 110. In other embodiments, the arm assembly 300 may include a plurality of holes adapted to receive the fastener 230, thereby providing radial adjustment of the arm assembly 300. Each of the circumferential, pivoting, and radial adjustments of the arm assembly 300 may be accomplished independently of one another, thereby providing substantial flexibility in orientating the arm assembly to virtually any coupling point disposed on the projector.

As illustrated in the depicted embodiment, the arm assembly 300 is efficiently adjustable and securable by adjustment of the fastener 230. By adjusting the fastener 230 in relation to the engaging feature 340, a head 231 of the fastener 230 is drawn down, engaging the upper member 215, and the engaging feature 340 engages a bottom surface 307 of the arm 301. A disk 235 may be disposed between the engaging feature 340 and the lower surface 207 to provide additional engagement area and/or securement. The disk 235 may comprise various structures, including a plate, biasing member, flat washer, split washer, and Bellville washer. The arm assembly 300 engages the lower member 220, in turn, engaging the periphery 110 between the lower member 220 and the upper member 215. As seen in FIGS. 5A and 5B, the coupling assembly 200 simultaneously secures the orientation of the arm assembly 300 in relation to the base 100 for the various adjustments by operatively coupling the arm assembly 300 to the periphery 110.

The arm assembly 300 may further include a connection portion adapted for operative connection to a coupling location disposed on the projector. The connection portion may be disposed proximate the first proximal end 304, the second distal end 302, or disposed between the first proximal end 304 and the second distal end 302. In embodiments, the arm assembly 300 may include a plurality of connection portions disposed at various locations on the arm assembly 300. The connection portion may comprise various features and/or assemblies, including assorted fasteners, brackets, and other components alone or in combination with each other adapted to operatively connect to the arm assembly 300 and the projector.

With reference to the embodiment depicted in FIG. 1, the connection portion comprises elevating structures 400. The elevating structures 400 may take on various forms, but in the depicted embodiment the elevating structures 400 comprises a "L" shaped member having an upright portion 405 and a lateral portion 415 substantially normal to the upright portion. The elevating structures 400 may be configured for operative connection to the arm 301. The elevating structures 400 may be adjustable in relation to the arm 301. In the embodiment depicted in FIG. 1, the elevating structures 400 are selectively adjustable in a direction substantially parallel to the axis of rotation defined by the fastener 230. Thus, differences in elevation of the various coupling locations of the projector may be accounted for by orientation of the elevating structures 400 in relation to the arm 301. The elevating structures 400 may include a plurality of holes disposed in the upright portion to selectively couple the elevating structures 400 to the arm 301. As shown in FIG. 1, the plurality of holes may comprise a slot 410. With reference to FIGS. 1, 5A and 5B, the elevating structures 400 may be received in a hole 338 disposed in the arm 301. The elevating structures 400 may be secured to arm 301 by a fastener 430 received by the slot 410 and a hole 338 disposed in the arm 301. The elevating structures 400 may further include at least one hole 420 disposed in the lateral portion 415. The at least one hole 420 is adapted to accept an engaging feature for operative connection to the projector. In an embodiment, the at least one hole 420 comprises a slot.

The above described arrangement may provide multiple points of adjustment to selectively orientate the arm assembly 300 in relation to the base 100. For example, in the depicted embodiment, a first degree of freedom is provided via circumferential orientation of the coupling assembly 200 to any point along the periphery 110. A second degree of freedom is provided by a rotation of the arm assembly 300 about an axis defined by the fastener 230. A third degree of freedom is provided by a radial translation of the arm 301 in relation to the fastener 230 received in the slot 330. Accordingly, this configuration permits the arm assembly 300 to be selectively orientated such that a portion of the arm assembly 300 may be positioned to any point within an area surrounding the center 120 of the mounting system 10. The boundary of the area is defined by the distance between the center 120 and the second distal end 302 when the arm assembly 300 is fully extended in a direction substantially normal to the periphery 110. The distance may further be extended in embodiments where the elevating structures 400 extend beyond the second distal end 302. In an embodiment, the mounting system 10 is configured such that a plurality of coupling points of the projector fall within the area such that the projector may be securely coupled to the mounting system 10.

The mounting system 10 may further comprise a mounting bracket 500 operatively connected to the base 100. The mounting bracket 500 may be adapted for operative connection to a surface bracket (not shown) operatively connected to a mounting surface. Alternatively, the mounting bracket 500 be configured for direct securement to the mounting surface. In embodiments, the mounting bracket 500 may be selectively orientatable in one or more orientations to impart a roll, pitch, and/or yaw to the operatively connected projector.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described to explain the principles of the present invention and its practical application to enable one skilled in the art to utilize the present invention in various embodiments and with various modifications as are suited to the particular use contemplated. The features of the embodiments described herein may be combined in all possible combinations of methods, apparatus, modules and systems.

What is claimed is:

1. A universal mount for mounting a device to a mounting structure, comprising:
    a base adapted to operatively connect to the mounting structure;
    a periphery continuously disposed about the base;
    a coupling structure operatively connectable to any point on the periphery, the coupling structure adapted to operatively connect to a coupling location disposed on the device,
    wherein at least a portion of the coupling structure is selectively translatable a distance extending radially from the periphery,
    wherein at least a portion of the coupling structure is selectively locatable to any point within an area disposed between the periphery and the distance,
    wherein the coupling structure includes an upper member and an arm assembly, the upper member being connectable to any point on the periphery and including a passage and a pivot axis, the passage receiving a portion of the periphery, and
    wherein the arm assembly is selectively rotatable about the pivot axis in relation to the upper member and the periphery.

2. The universal mount of claim 1, wherein the periphery comprises at least one surface extending in at least one of an upward and downward direction from the base.

3. The universal mount of claim 1, wherein the arm assembly is also selectively translatable along the pivot axis relative to the upper member and the periphery.

4. A universal mount for mounting a device to a mounting structure, comprising:
    a base adapted to operatively connect to the mounting structure;
    a periphery continuously disposed about the base; and
    a coupling structure operatively connectable to any point on the periphery, the coupling structure adapted to operatively connect to a coupling location disposed on the device,
    wherein at least a portion of the coupling structure is selectively translatable a distance extending radially from the periphery,
    wherein at least a portion of the coupling structure is selectively locatable to any point within an area disposed between the periphery and the distance,
    wherein the periphery includes a flange that extends away from the base, and
    wherein the flange engages a channel of the coupling structure when the coupling structure and periphery are coupled together.

5. A universal mount for mounting a device to a mounting structure, comprising:
    a base adapted to operatively connect to the mounting structure;
    a periphery continuously disposed about the base; and
    a coupling structure operatively connectable to any point on the periphery, the coupling structure adapted to operatively connect to a coupling location disposed on the device,
    wherein at least a portion of the coupling structure is selectively translatable a distance extending radially from the periphery,
    wherein at least a portion of the coupling structure is selectively locatable to any point within an area disposed between the periphery and the distance, and
    wherein when the coupling structure is connected to the periphery a passage in the coupling structure receives a portion of the periphery.

* * * * *